Figure 1:
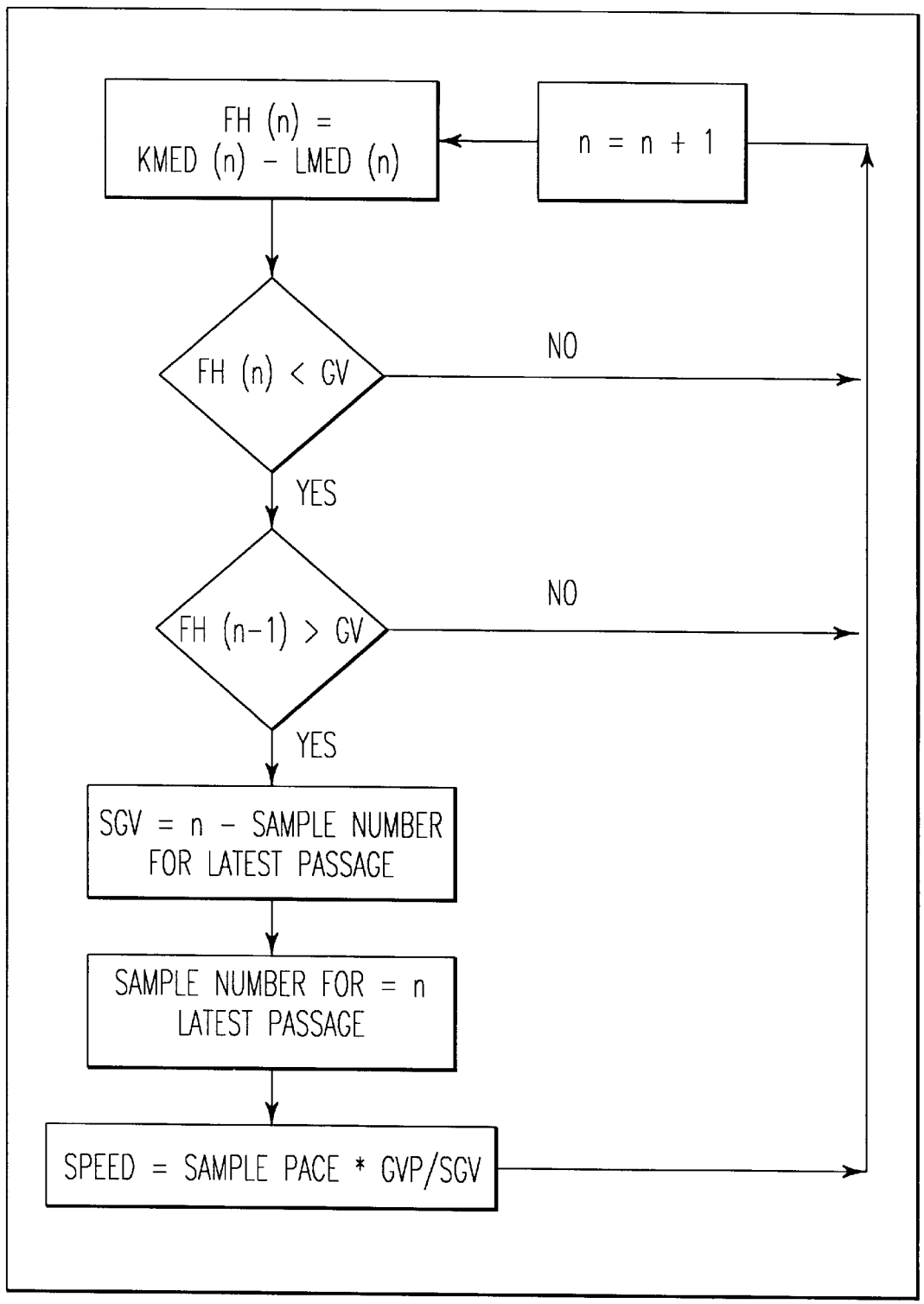

United States Patent

Wickman et al.

[11] Patent Number: 5,983,104
[45] Date of Patent: Nov. 9, 1999

[54] MOBILE COMMUNICATIONS SYSTEM WITH MOBILE UNIT SPEED IDENTIFICATION FEATURES

[75] Inventors: Johan Wickman, Bjarred; Peter Olanders, Lomma, both of Sweden

[73] Assignee: Telia AB, Farsta, Sweden

[21] Appl. No.: 08/776,603

[22] PCT Filed: Jul. 11, 1995

[86] PCT No.: PCT/SE95/00846

§ 371 Date: Apr. 3, 1997

§ 102(e) Date: Apr. 3, 1997

[87] PCT Pub. No.: WO96/07279

PCT Pub. Date: Mar. 7, 1996

[30] Foreign Application Priority Data

Aug. 19, 1994 [SE] Sweden .................................. 9402768

[51] Int. Cl.[6] .................................................. H04Q 7/20
[52] U.S. Cl. ........................... 455/441; 455/444; 455/504
[58] Field of Search ..................................... 455/439, 441, 455/443, 444, 504, 517; 370/332, 333

[56] References Cited

U.S. PATENT DOCUMENTS

| 5,239,667 | 8/1993 | Kanai . | |
|---|---|---|---|
| 5,265,263 | 11/1993 | Ramsdale | 455/441 |
| 5,396,645 | 3/1995 | Huff | 455/441 |
| 5,513,380 | 4/1996 | Ivanov et al. | 455/441 |
| 5,548,806 | 8/1996 | Yamagushi et al. | 455/441 |
| 5,574,971 | 11/1996 | Aihara | 455/441 |

FOREIGN PATENT DOCUMENTS

| 2274228 | 7/1994 | United Kingdom . |
|---|---|---|
| 9201950 | 2/1992 | WIPO . |

*Primary Examiner*—Edward F. Urban
*Attorney, Agent, or Firm*—Oblon, Spivak McClelland, Maier & Neustadt, P.C.

[57] ABSTRACT

In telecommunication systems, for instance of the type DECT, there are mobile units which move within and between the cells of the system. The new device identifies mobile units which move with a predetermined speed and the identification is performed by means of fading measurements.

9 Claims, 2 Drawing Sheets

MOBILE COMMUNICATIONS SYSTEM WITH MOBILE UNIT SPEED IDENTIFICATION FEATURES

TECHNICAL FIELD

The present invention relates to a device at telecommunication system, for instance DECT which comprises mobile units which are moving within or between the cells of the system.

STATE OF THE TECHNOLOGY

It is in itself known to perform determinations of speed based on the Doppler effect or on a longer time of measuring of the passage of the mobile through several cells. The Doppler effect is proportional to the quotient speed of vehicle/speed of light, which at the speed of 10 ms would imply a doppler shift of 60 Hz, which is quite negligible compared with bandwidth, operating frequency and normal frequency change caused by for instance heat release in the equipment. Measuring of the passage of the mobile through several cells is a blunt instrument if there is no indication whether the portable passes the cell diametrically or peripherally. Even a comparatively slow portable can peripherally pass many cells rapidly. The method also assumes that connection is established and is by that not good to use to deny connection.

DESCRIPTION OF THE INVENTION

Technical Problem

DECT (Digital European Cordless Telecommunications) is a pronounced small cell system, with typical cell radius of 100–500 meters at mobile applications i open environment. A user who is travelling "rapidly" through a region which is covered by several linked up DECT-cells will therefore cause many handovers (shifting of existing call from one cell to another; there are both intercell handovers and intracell handovers; it is the former which is related to here). If the number of intercell handovers becomes very large, this will load down the underlying network and cause increased signalling (to the central unit existing behind, and/or to VLR, etc).

Even if high handover frequency is accepted, problems remain with keeping a high transmission quality at higher speeds. The problem is caused by the fact that the gain with antenna diversity is reduced at higher speeds for DECT, because diversity algorithms where only one unit has antenna diversity must perform some form of prediction with speed depending validity—at higher speeds the mobile gets time to travel as far during a time frame that the level of the Rayleigh fading will get time to change several dB. This means that one for higher speeds either must increase the fading margin, which implies a reduced cell size, or resort to coding and/or interleaving as for instance for GSM.

For this reason all public operators of DECT have an interest in sorting out those DECT portables which are moving "too rapidly" for making it possible/profitable to deal with the calls.

For an operator who operates both mobile networks and DECT-networks it is even more interesting to be able to distinguish those portables which are moving "too rapidly". If dual-mode hand units (for instance DECT+GSM) are used, the operator has a very great interest in that rapid portables are using the mobile telephone system, so that motorized mobiles which are moving rapidly do not "flow over" to DECT. The operator will of course see to it that each network is used optimally, and also that the combination of these becomes optimal.

In this connection it can be worth explaining what is meant by "rapid movement". Tests have shown that DECT-systems manage dealing with portables which are moving with speeds up to 70 km/h (in these tests there were probably not time to reach higher vehicle speeds within a DECT-covered area). It is reasonable to assume that the tests were performed so that the portable passed on the whole diametrically through the cells, in order to cause as few handovers as possible. With the assumption that the cell passages on the average are considerably more peripheral, it is reasonable to use speed limits in the range 20–40 km/h (i.e. about 10 m/s; 5–10 times walking speed). The operator shall of course have possibility to decide which limit that should be used.

As a conclusion the technical problem is that DECT-portables which are moving "too rapidly" causes a too high handover frequency with a "too large" background signalling and also risk worse transmission quality alternatively more expensive cell structure. Dual-mode hand units should also be possible to be routed into the network which best can deal with its traffic.

The Solution

What primarily can be regarded as characteristic for a device according to the invention will be evident from the characteristic parts of the following patent claims.

Advantages

By what has ben suggested above a practically applicable device can be arranged. So have for instance measurements with 2000 samples per second been performed, which correspond to 1 DECT time-slot per sample in different milieus for different speeds. The preliminary evaluations of the measurements verify the usefulness of the invention in these contexts. The invention can be used for sorting out DECT portables which are moving with too high speed for making it interesting or profitable for the operator to establish connections with the portables. The invention is probably of greatest interest for public operators, but also operators of private networks might have the same interest. Beside mentioned field of application, the invention can be used in all types of small cells, and also in mobile telephone systems, for instance for a coarse sorting.

LIST OF FIGURES

One at present suggested embodiment of a device which shows the significant characteristics of the invention will be described below, while at the same time is referred to enclosed drawings, where FIG. 1 shows a description of the invention in the form of a flow chart.

Figure 2:
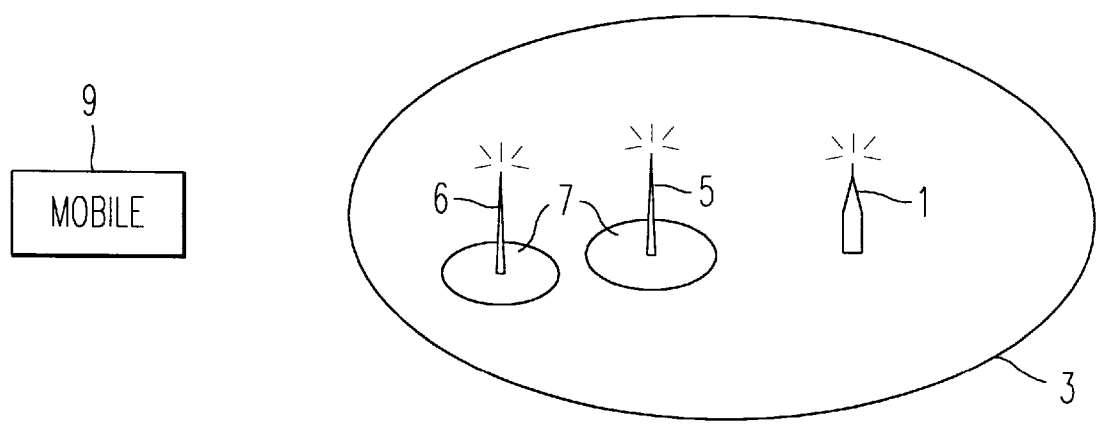

FIG. 2 is a system-level diagram showing a mobile unit and a communication network that includes a large cell, such as that used with GSM, and a small cell, such as that used with DECT.

DETAILED EXAMPLE OF EMBODIMENT

The invention is based on the fact that the speed of the mobile is decided by means of fading measurements. Fading is made up of variations in the signal strength i time or space due to interference between different propagation paths and (varying) shadowing. A receiver always experiences a certain fading due to the fact that the surrounding is moving, for instance cars, people, swaying trees etc. The objects can act as reflectors. In other words they need not shadow the direct ray to have an influence. This type of background fading shows a big variation concerning periodicity and amplitude. Normally in suburban and urban surroundings the background fading has a rapid component with a small amplitude, and one very slow with varying amplitude.

When the receiver is moving, it furthermore experiences two types of fading:

1) Rapid fading which is Rayleigh-distributed. This implies among other things that the average distance between two signal strength minima is a half wavelenght. Rayleigh-fading has a very big amplitude variation.

2) Slow fading which is lognormal-distributed.

The fading measurements can be performed according to the following:

Mobile- or base unit performs signal strength measurements. These measurements are performed with a defined measurement pace (sample frequency).

The signal strength values are averaged over a "short" time. For DECT about 100 ms is suitable. The short time average (KMED) represents this average.

The signal strength values are averaged over a "long" time. For DECT about 1 s is suitable. The long time average (LMED) represents this average.

The fading determination can, according to the invention, also be performed as below:

The fading (FH), which constitutes the basis for the speed determination, consists of the difference between short time average and long time average: FH=KMED—IMED.

The speed determination according to the invention is performed as follows:

The distance between two consecutive passages for the fading of a certain limit value (GV) shall be calculated. The passages shall have the same symbol. The distance is designated SGV.

GV is a constant which is chosen optimally with regard to vawe lenght and speed interval. GV can for DECT for instance be chosen to −2 dB.

GVP is a constant which is chosen optimally with regard to GV. GVP can be said to express a reference distance for SGV.

The speed is calculated according to:

Speed=Sample rate*GVP/SGV.

There are several reasons for using the short time average instead of a momentary signal strength value.

In this way errors due to sparse sampling relatively the structure of the fading at moderate and high speeds are eliminated. Example: For a DECT-portable is obtained a measurement value per frame, i.e. 100 measurement values per second. At 10 m/s this corresponds to a distance of 10 cm between each measurement value. This can be compared with the average distance between two minima at Rayleigh-fading which is a half vawelenght, i.e. about 8 cm. Accordingly it will be difficult to characterize the Rayleigh-fading.

The influence from frequency jumps is reduced. With the short time average a comparatively frequency independent fading will be used for the speed determination.

the influence from time slot jumps will be reduced, as will the influence of antenna micro diversity, if any. On the whole the influence of background fading is eliminated.

FIG. 2 shows a mobile network that includes a base station 1, that provides a coverage area 3, which is a "large cell". An example of such a mobile network is a GSM system. A DECT, an example of a small cell network, transmitters 5 and 6 provide smaller cell coverage areas, microcells 7, as shown. A mobile unit 9 moves between cells 3 and 7 and communicates with the respective transmitters 1, 5 and 6.

The invention is not restricted to the above as example shown embodiment, but may be subject to modifications within the frame of the following patent claims and idea of invention.

We claim:

1. A communication system comprising:

a small cell network having a wireless communication facility that provides a microcell coverage area;

a mobile network having a second wireless communication facility that covers a macrocell coverage area that includes at least a portion of the microcell coverage area; and a mobile unit configured to communicate with the second wireless communication facility and the first wireless communication facility, signals between said mobile unit and said second wireless communication facility and said first wireless communication facility being subject to signal strength variations caused by signal fading when said mobile unit moves at a predetermined speed, wherein a speed determination mechanism being included in at least one of said mobile unit, said second wireless communication facility and said first wireless communication facility and configured to measure said signal strength at a predetermined sampling frequency and approximate a velocity of said mobile unit by comparing an average of the signal strength measurements with a stored value, and a selection mechanism being included in at least one of said second wireless communication facility and said first wireless communication facility configured to select whether to grant access to said mobile unit for communication within said small cell network if said velecity of said mobile unit approximated by said speed determination mechanism exceeds a predetermined speed.

2. The system of claim 1, wherein:

said speed determination mechanism does not approximate said velocity using using diversity reception.

3. The system of claim 1, wherein:

said small cell network being a DECT network; and said mobile network being a GSM network.

4. The system of claim 1, wherein:

said speed determination mechanism being configured to average said signal strength measurements for a predetermined time interval of about 100 msec.

5. The system of claim 1, wherein:

said speed determination mechanism being configured to average the signal strength measurements over a long time corresponding with about one second.

6. The system according to claim 1, wherein:

a signal fading condition that corresponds with the velocity of the mobile unit, as approximated by said speed determination mechanism, being associated with a difference between a short time average and long time average of said signal strength measurements taken at said predetermined sampling frequency.

7. The system of claim 1, wherein:

said selection mechanism being configured to assign said mobile unit to communicate with said mobile network when said velocity of said mobile unit is determined to exceed the predetermined speed, a distance between adjacent fading conditions being recognized as an indirect measure of said velocity;

said selection mechanism being configured to determine said distance beween adjacent fading conditions by calculating a limit value from a constant associated with a given wavelength and a reference distance between adjacent signal fading conditions; and said speed determination mechanism approximating said velocity as being equal to the predetermined sampling frequency*the reference distance/the distance between adjacent signal fading conditions.

8. The system of claim 1, wherein:

said selection mechanism being configured to assign said mobile unit to said mobile network, and not said small cell network, when the velocity of said mobile unit exceeds 40 km/hr.

9. The system according to claim 1, wherein:

the sampling frequency being about 200 samples per second.

* * * * *